(12) United States Patent
Kim

(10) Patent No.: US 12,272,192 B2
(45) Date of Patent: Apr. 8, 2025

(54) ELECTRONIC SYSTEM INTEGRATED VERIFICATION DEVICE AND METHOD OF CONTROLLING THEREOF

(71) Applicants: Hyundai Motor Company, Seoul (KR); Kia Corporation, Seoul (KR)

(72) Inventor: Il Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 215 days.

(21) Appl. No.: 18/077,756

(22) Filed: Dec. 8, 2022

(65) Prior Publication Data

US 2023/0351821 A1 Nov. 2, 2023

(30) Foreign Application Priority Data

May 2, 2022 (KR) .................. 10-2022-0054057

(51) Int. Cl.
*G07C 5/08* (2006.01)
*B60W 50/14* (2020.01)

(52) U.S. Cl.
CPC ........... *G07C 5/0825* (2013.01); *B60W 50/14* (2013.01); *B60W 2050/146* (2013.01)

(58) Field of Classification Search
CPC ............... G07C 5/0825; B60W 50/14; B60W 2050/146; B60W 50/0205; B60W 2050/021; B60W 50/00; B60W 2050/0002; B60K 35/22; B60K 2360/16; B60K 2360/162; B60K 35/28; B60K 35/00; B60K 35/29; B60K 35/85; B60R 16/023; B60R 16/03; B60Y 2400/92
See application file for complete search history.

(56) References Cited

U.S. PATENT DOCUMENTS

| 11,002,779 B2 * | 5/2021 | Haro ..................... G01R 31/007 |
| 2015/0094905 A1 * | 4/2015 | Frashure ................. B60T 17/22 701/33.2 |
| 2016/0121792 A1 * | 5/2016 | Christopherson ...... G01R 31/44 340/431 |

* cited by examiner

*Primary Examiner* — Michael V Kerrigan
(74) *Attorney, Agent, or Firm* — Fish & Richardson P.C.

(57) ABSTRACT

An electronic system integrated verification device includes a communication interface configured to communicate with a vehicle system, a power supply configured to supply power to the vehicle system, a display configured to display information on a state of the vehicle system, and a processor configured to receive output signals of a plurality of controllers included in the vehicle system through the communication interface, determine a state of each of the plurality of controllers based on the output signals of the plurality of controllers, and control the display to display a screen indicating the state of each of the plurality of controller.

14 Claims, 7 Drawing Sheets

ELECTRONIC SYSTEM INTEGRATED VERIFICATION DEVICE AND METHOD OF CONTROLLING THEREOF

CROSS-REFERENCE TO RELATED APPLICATION(S)

This application claims the benefit of Korean Patent Application No. 10-2022-0054057, filed on May 2, 2022, which application is hereby incorporated herein by reference.

TECHNICAL FIELD

The present disclosure relates to an electronic system integrated verification device capable of monitoring states of control units provided in a vehicle for various operating conditions of the vehicle, and a method of controlling thereof.

BACKGROUND

Conventional electronic devices provided in a vehicle may exchange data through a vehicle communication network. For example, electronic control units (ECUs) of electronic devices may communicate with each other using a controller area network (CAN). A gateway may perform a routing between CAN messages having different domains. Tests to electronic devices of a vehicle are performed to prevent breakdown of the vehicle before the vehicle is released. A separate diagnostic device may be used for testing electronic devices.

However, a conventional electronic system integrated verification device may only individually diagnose whether a specific control unit operates normally. The conventional electronic system integrated verification device does not monitor status of all the control units provided in a vehicle, and also does not easily provide a user with the status of all the control units. In addition, because the conventional electronic system integrated verification device may not provide failure situations occurring in various operating states of the vehicle, tests to the control units in various operating states of the vehicle are unavailable.

SUMMARY

An aspect of the present disclosure is to provide an electronic system integrated verification device capable of monitoring states of controllers included in a vehicle system according to various operating states and environmental conditions of the vehicle system, and a method of controlling thereof.

Another aspect of the present disclosure is to provide an electronic system integrated verification device capable of providing a graphical user interface indicating states of all controllers included in a vehicle system, and a method of controlling thereof.

In accordance with an aspect of the disclosure, an electronic system integrated verification device includes a communication interface configured to communicate with a vehicle system, a power supply configured to supply power to the vehicle system, a display configured to display information on a state of the vehicle system, and a processor configured to receive output signals of a plurality of controllers included in the vehicle system through the communication interface, determine a state of each of the plurality of controllers based on the output signals of the plurality of controllers, and control the display to display a screen indicating the state of each of the plurality of controller.

The processor may be further configured to, whenever an operating state of the vehicle system is changed, control the display to display the screen indicating the states of the plurality of controllers corresponding to the operating states of the vehicle system.

The processor may be further configured to control the display to display a first screen indicating the state of each of the plurality of controllers based on a starting-on (ON) of the vehicle system, display a second screen indicating the state of each of the plurality of controllers of the vehicle system while driving, and display a third screen indicating the state of each of the plurality of controllers based on a starting-off (OFF) of the vehicle system.

The processor may be further configured to control the display to display a fourth screen indicating the state of each of the plurality of controllers based on an unlocking of the vehicle system after the starting-off and locking of the vehicle system.

The processor may be further configured to determine whether the state of each of the plurality of controllers is a wake-up, a sleep ready, a sleep ack, or a sleep, and control the display to display a plurality of graphic elements corresponding to the states of the plurality of controllers.

The processor may be further configured to generate the plurality of graphic elements so that each of the plurality of graphic elements has a predetermined color corresponding to the wake-up, the sleep ready, the sleep ack, or the sleep.

The processor may be further configured to control the power supply to supply a predetermined test power corresponding to a predetermined environmental condition to the vehicle system.

The processor may be further configured to generate input signals to be input to the plurality of controllers of the vehicle system based on a predetermined driving scenario, control the communication interface to transmit the input signals to the vehicle system, and receive the output signals of the plurality of controllers corresponding to the input signals.

In accordance with another aspect of the disclosure, a method of controlling an electronic system integrated verification device includes controlling, by a processor, a power supply to supply power to a vehicle system, receiving, by the processor, output signals of a plurality of controllers included in the vehicle system through a communication interface, determining, by the processor, a state of each of the plurality of controllers based on the output signals of the plurality of controllers, and controlling, by the processor, a display to display a screen indicating the state of each of the plurality of controllers.

The controlling the display may further include, whenever an operating state of the vehicle system is changed, displaying the screen indicating the states of the plurality of controllers corresponding to the operating states of the vehicle system.

The controlling the display may further include displaying a first screen indicating the state of each of the plurality of controllers based on a starting-on (ON) of the vehicle system, displaying a second screen indicating the state of each of the plurality of controllers of the vehicle system while driving, and displaying a third screen indicating the state of each of the plurality of controllers based on a starting-off (OFF) of the vehicle system.

The controlling the display may further include displaying a fourth screen indicating the state of each of the plurality controllers based on an unlocking of the vehicle system after the starting-off and locking of the vehicle system.

The state of each of the plurality of controllers may be determined as a wake-up, a sleep ready, a sleep ack, or a sleep, and the controlling the display may further include generating a plurality of graphic elements corresponding to the states of the plurality of controllers.

Each of the plurality of graphic elements may be displayed in a predetermined color corresponding to the wake-up, the sleep ready, the sleep ack, or the sleep.

The controlling the power supply may further include supplying a predetermined test power corresponding to a predetermined environmental condition to the vehicle system.

The receiving the output signals may further include generating input signals to be input to the plurality of controllers of the vehicle system based on a predetermined driving scenario, controlling the communication interface to transmit the input signals to the vehicle system, and receiving the output signals of the plurality of controllers corresponding to the input signals.

DETAILED DESCRIPTION

Figure 1:
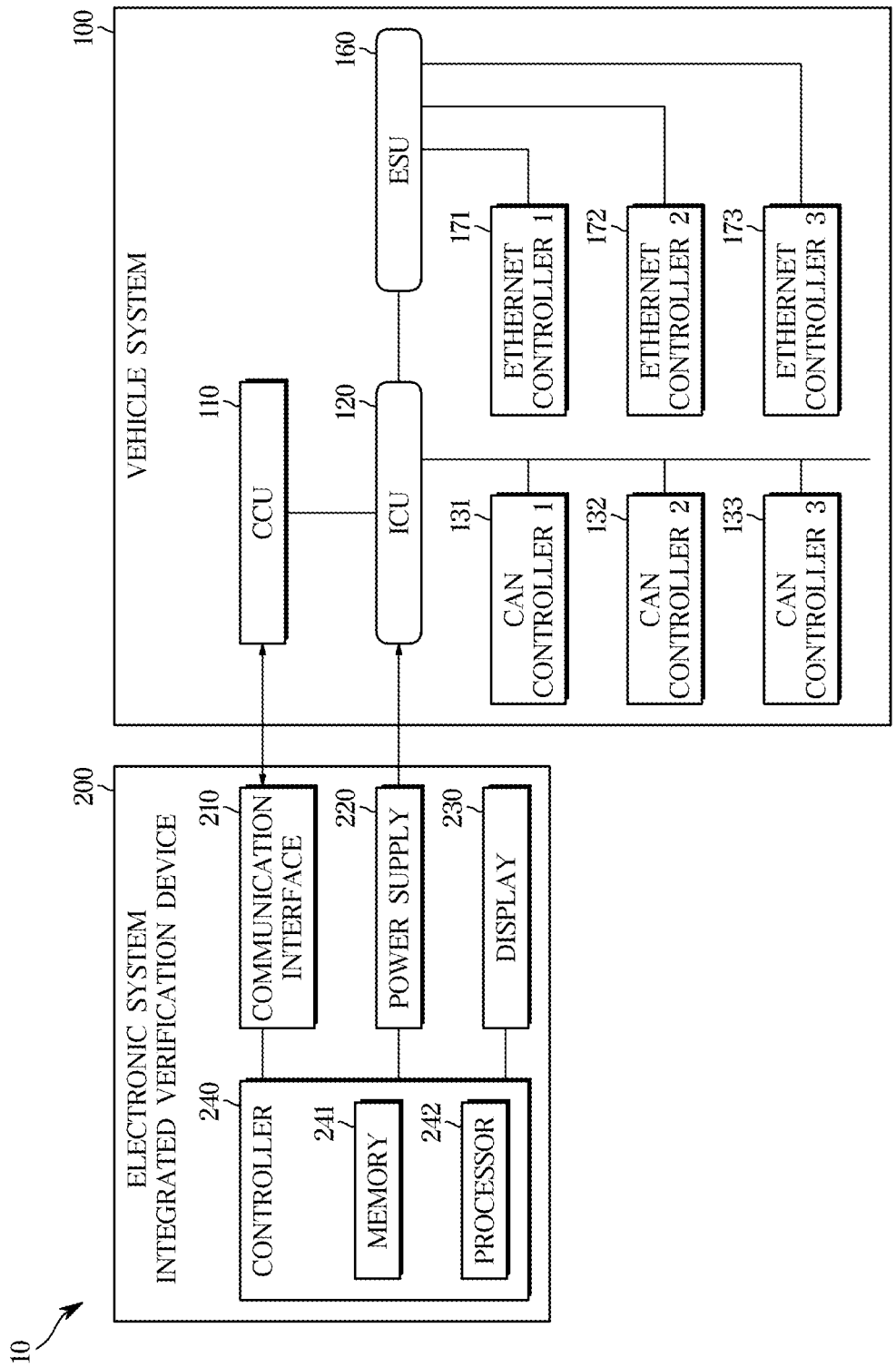
FIG. 1 is a diagram illustrating an example of a vehicle diagnostic system.
Figure 2:
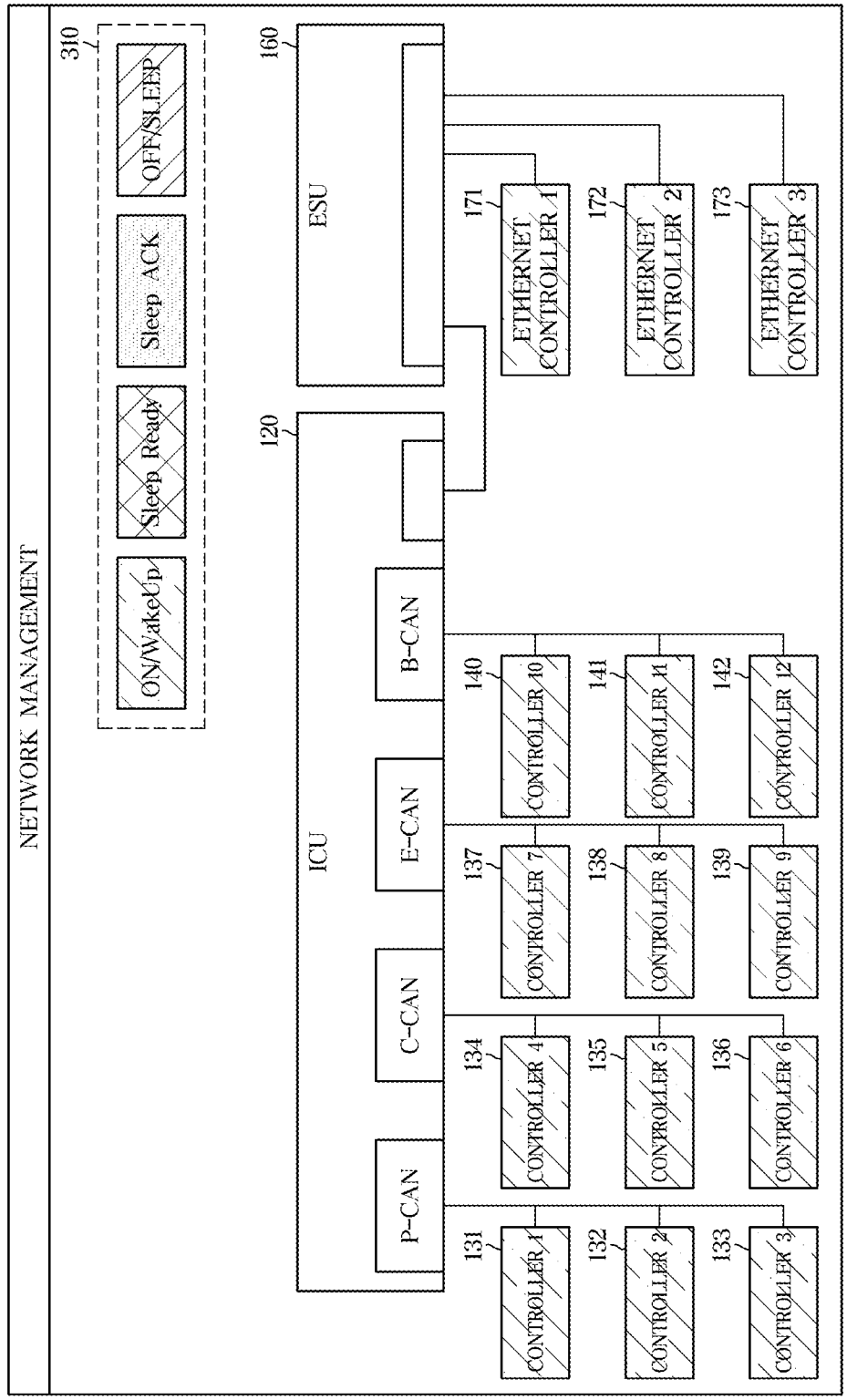
FIG. 2 is a diagram illustrating an example of a screen displayed on an electronic system integrated verification device.
Figure 3:
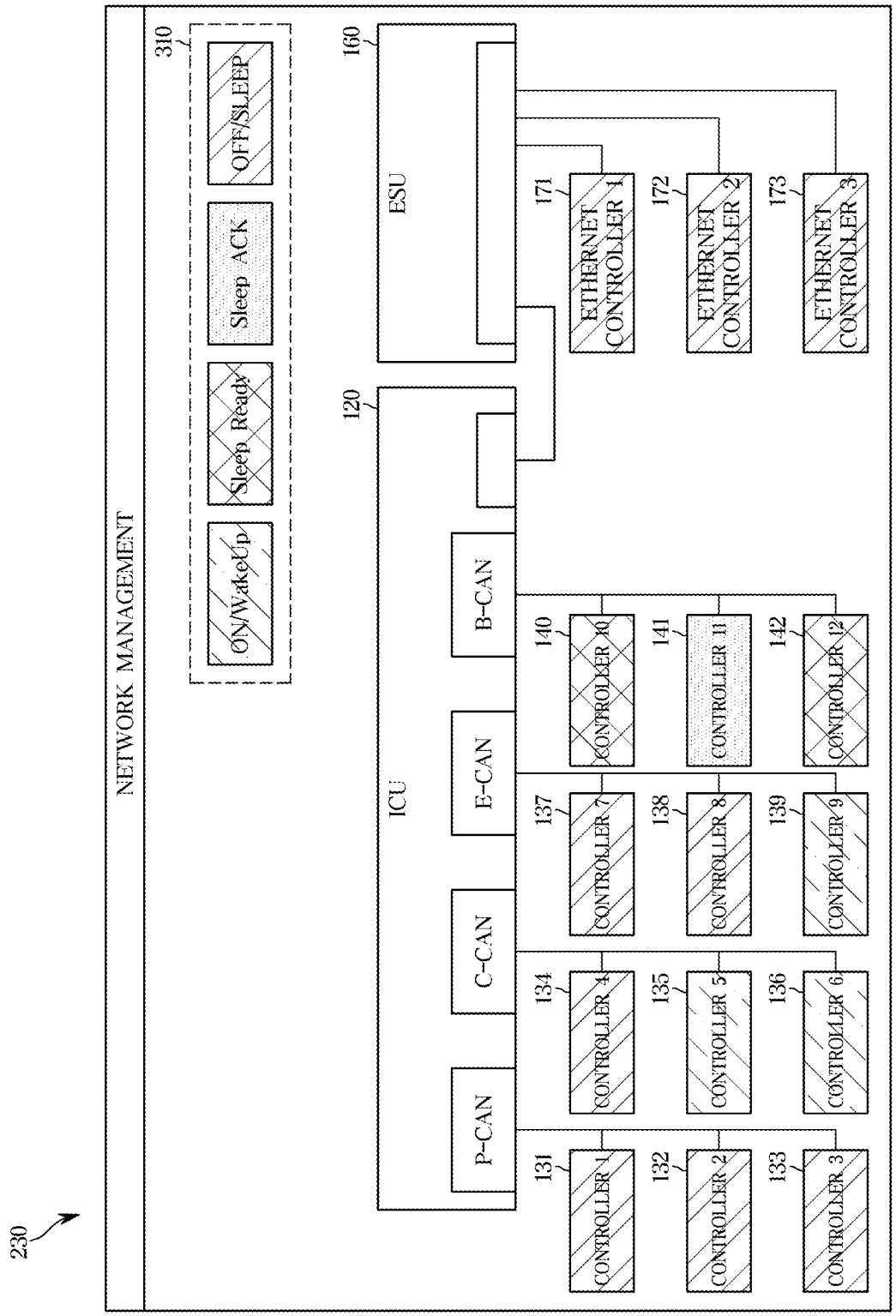
FIG. 3 is a diagram illustrating an example of the screen displayed on the electronic system integrated verification device.

FIG. 1 is a diagram illustrating a vehicle diagnostic system. FIGS. 2 and 3 are diagrams illustrating screens displayed on an electronic system integrated verification device according to operating states of a vehicle system.

Referring to FIG. 1, a vehicle diagnosis system 10 may include a vehicle system 100 and an electronic system integrated verification device 200. The vehicle system 100 and the electronic system integrated verification device 200 may communicate with each other. The electronic system integrated verification device 200 may transmit an input signal to the vehicle system 100, and the vehicle system 100 may transmit an output signal corresponding to the received input signal to the electronic system integrated verification device 200. The vehicle system 100 and the electronic system integrated verification device 200 may be connected using a wireless communication or a wired communication. Various wireless communication technologies may be used for communication between the vehicle system 100 and the electronic system integrated verification device 200. In addition, various wired communication technologies may be used for communication between the vehicle system 100 and the electronic system integrated verification device 200.

The vehicle system 100 may include a communication control unit (CCU) 110, an integrated control unit (ICU) 120, and an Ethernet switch unit (ESU) 160. Furthermore, the vehicle system 100 may include various controller area network (CAN) controllers 131, 132, and 133 and various Ethernet controllers 171, 172, and 173.

The CCU 110 may perform a communication connection between the electronic system integrated verification device 200 and the vehicle system 100. The CCU 110 may include a wireless communication circuitry and/or a wired communication circuitry. The CCU 110 may be referred to as a transceiver. The CCU 110 is connected to the ICU 120 of the vehicle system 100. The CCU 110 may transmit the input signal transmitted from the electronic system integrated verification device 200 to the ICU 120. Furthermore, the CCU 110 may transmit the output signal of the CAN controllers 131, 132, and 133 and the output signal of the Ethernet controllers 171, 172, and 173 to the electronic system integrated verification device 200.

The ICU 120 may serve as a gateway. The ICU 120 may perform the CAN communication connection between the CAN controllers 131, 132, and 133. In some implementations, the ICU 120 may include a CAN input buffer, a CAN output buffer, a processor, and an Ethernet interface. The CAN output buffer may receive and store CAN messages from the processor, and transmit the CAN messages to a CAN communication bus. The CAN input buffer may receive and store the CAN messages from the CAN communication bus, and transmit the CAN messages to the processor.

The ICU 120 may be connected to various CAN communication buses, and may relay the CAN messages transmitted between the CAN controllers 131, 132, and 133 connected to the CAN communication buses. The ICU 120 may provide the input signals to the CAN controllers 131, 132, and 133, and receive the output signals of the CAN controllers 131, 132, and 133.

The ESU 160 may perform a communication connection between the Ethernet controllers 171, 172, and 173. The ESU 160 may include a plurality of ports, a processor, and a memory to which the Ethernet controllers 171, 172, and 173 are connected. The Ethernet controllers 171, 172, and 173 may be connected to an Ethernet communication bus. The ESU 160 may relay Ethernet messages transmitted between the Ethernet controllers 171, 172, and 173. The ESU 160 may provide the input signals to the Ethernet controllers 171, 172, and 173, and receive the output signals of the Ethernet controllers 171, 172 and 173.

The ICU 120 may be connected to the ESU 160. The ICU 120 may perform routing for exchanging messages between controllers using different protocols. When it is necessary to exchange messages between controllers connected to different communication buses, the ICU 120 may perform a message routing with reference to a routing table. The ICU 120 may perform the message routing based on IDs of the messages transmitted by the CAN controllers and the Ethernet controllers.

The ICU 120 may perform conversion between the CAN messages and the Ethernet messages, which have different protocols to each other. For example, the ICU 120 may convert the CAN messages received from the CAN controllers 131, 132, and 133 into the Ethernet messages. In addition, the ICU 120 may convert the Ethernet messages received from the Ethernet controllers 171, 172, and 173 through the ESU 160 into the CAN messages.

Referring to FIGS. 2 and 3, the CAN controllers 131-142 may be grouped into a plurality of domains according to communication protocols, functional characteristics, and purpose of use. The plurality of domains may be configured with individual communication buses. For example, the first CAN controller 131, the second CAN controller 132, and the third CAN controller 133 may be connected to a P-CAN communication bus. The fourth controller 134, the fifth controller 135, and the sixth controller 136 may be connected to a C-CAN communication bus. The seventh controller 137, the eighth controller 138, and the ninth controller 139 may be connected to an E-CAN communication bus. The tenth controller 140, the eleventh controller 141 and the twelfth controller 142 may be connected to a B-CAN communication bus.

Various types of electronic devices included in the vehicle system 100 may include the CAN controllers and/or Ethernet controllers. The CAN controllers 131-142 may refer to an electronic control unit to which the CAN protocol is applied, and the Ethernet controllers 171-173 may refer to an electronic control unit to which scalable service-oriented middleware over IP (SOME/IP) protocol is applied.

For example, the CAN controllers 131-142 may be included in various types of sensors included in the vehicle system 100. The sensor may include a camera that acquires image data by capturing an image around the vehicle. In addition, the sensor may include a radar that acquires location information, distance information, and speed information on an object around the vehicle (e.g., a preceding vehicle, a pedestrian). The vehicle system 100 may include a speed sensor for detecting a speed, an acceleration sensor for detecting acceleration of the vehicle, a yaw rate sensor for detecting a rotational angular speed of the vehicle, a gyro sensor for detecting an inclination of the vehicle, a steering angle sensor for detecting a rotation and steering angle of a steering wheel, a temperature sensor for detecting an indoor temperature and an outdoor temperature of the vehicle, and/or an illuminance sensor for detecting external illuminance.

The vehicle system 100 may include a variety of other electronic devices as well as the sensors. For example, the vehicle system 100 includes an engine management system that generates power, a transmission control system that transmits power generated by the engine to wheels of the vehicle, a braking system that slows or stops the vehicle through friction with the wheels, and a body control system that provides convenience to a driver or ensures safety of a driver. The body control system may include an airbag control device for the safety of occupants such as a driver in the event of a vehicle collision, an electronic stability control device (ESC) that controls posture of the vehicle when accelerating or cornering, and a lane keeping assist system (LKAS) and a lane following assist system (LFAS) that assists to prevent deviations from a driving lane. Each of the above-described electronic devices may include the Ethernet controller.

Electronic devices included in the vehicle system 100 are not limited to the above-described electronic devices. The vehicle system 100 may further include other electronic devices in addition to the aforementioned electronic devices. For convenience purpose only, the CAN controllers 131-142 and the Ethernet controllers 171-173 are referred to as a plurality of controllers.

Referring back to FIG. 1, the electronic system integrated verification device 200 may include a communication interface 210, a power supply 220, a display 230, and a controller 240. The communication interface 210 may perform the communication connection between the electronic system integrated verification device 200 and the vehicle system 100. The communication interface 210 may include a wireless communication circuitry and/or a wired communication circuitry. The communication interface 210 may transmit and receive data and/or signals to and from the CCU 110 of the vehicle system 100.

The power supply 220 may supply power to the vehicle system 100. The power supply 220 may be connected to the ICU 120 of the vehicle system 100, and apply voltage and current to the ICU 120. The ICU 120 of the vehicle system 100 may include a power distribution circuit for distributing the power supplied from the power supply 220 to components of the vehicle system 100. The power supply 220 may supply wired power or wireless power to the vehicle system 100. The power supply 220 may supply a predetermined test power corresponding to a predetermined environmental condition to the vehicle system 100.

The display 230 may display various information regarding states of the vehicle system 100 connected to the electronic system integrated verification device 200. The display 230 may display a screen indicating the state of each of the plurality of controllers included in the vehicle system 100. The display 230 may display a graphical user interface (GUI) including a plurality of graphic elements corresponding to states of the plurality of controllers. The display 230 may display screen indicating states of the plurality of controllers corresponding to operating states of the vehicle system 100 whenever the operating state of the vehicle system 100 is changed.

Referring to FIG. 2, the display 230 may display a first screen indicating the state of each of the plurality of controllers based on a starting-on of the vehicle system. Furthermore, the display 230 may display a second screen indicating the state of each of the plurality of controllers of the vehicle system 100 while driving.

Referring to FIG. 3, the display 230 may display a third screen indicating the state of each of the plurality of controllers based on a start-off of the vehicle system 100. Furthermore, the display 230 may display a fourth screen indicating the state of each of the plurality of controllers based on a unlocking of the vehicle system 100 after the vehicle system 100 is turned off and locked.

The display 230 may include various types of display panels. For example, the display 230 may include a liquid crystal display (LCD) Panel, a light emitting diode (LED) Panel), an organic light emitting diode Panel (OLED) Panel, or a micro LED panel.

The controller 240 may include a memory 241 and a processor 242. The controller 240 may be electrically connected to the components of the electronic system integrated verification device 200 and control each component thereof.

The memory 241 may store programs, instructions, and/or applications for operating the electronic system integrated verification device 200. The memory 241 may include a non-volatile memory device such as a cache, a read only memory (ROM), a programmable ROM (PROM), an erasable programmable ROM (EPROM), an electrically erasable programmable ROM (EEPROM), and a flash memory. In addition, the memory 241 may include a volatile memory device such as a random access memory (RAM), and may include a storage medium such as a hard disk drive (HDD) or a CD-ROM.

The processor 242 may generate a control signal for controlling the operation of the electronic system integrated verification device 200 based on instructions, applications, data, and/or programs stored in the memory 241. The processor 242 is a hardware, and may be include a logic circuit and an arithmetic circuit. The processor 242 may process data according to programs and/or instructions provided from the memory 241, and generate a control signal according to the processing result. The processor 242 and the memory 241 may be integrated on one chip, or may be provided in physically separate locations. The processor 242 and the memory 241 may be provided in plurality.

The components of the vehicle diagnosis system 10, the vehicle system 100, and the electronic system integrated verification device 200 are not limited to those described above. The vehicle diagnosis system 10, the vehicle system 100, and the electronic system integrated verification device 200 may further include other components in addition to the above-described components.

The processor 242 of the electronic system integrated verification device 200 may receive the output signals of the plurality of controllers included in the vehicle system 100 through the communication interface 210. The processor 242 may determine the state of each of the plurality of controllers based on the output signals of the plurality of controllers. The processor 242 may control the display 230 to display a screen including graphic elements indicating the state of each of the plurality of controllers.

The processor 242 may determine whether the state of each of the plurality of controllers is a wake-up, a sleep ready, a sleep ack, or a sleep. The processor 242 may generate a plurality of graphic elements corresponding to the states of the plurality of controllers, and may control the display 230 to display the plurality of graphic elements.

For example, each of the plurality of graphic elements may have predetermined colors corresponding to the wake-up, sleep ready, sleep ack, or sleep. The color of the graphic element corresponding to the state of wake-up may be green. The color of the graphic element corresponding to the state of sleep ready may be yellow. The color of the graphic element corresponding to the state of sleep ack may be blue. The color of the graphic element corresponding to the state of sleep may be gray.

In FIGS. 2 and 3, it is illustrated that box elements representing each controller are filled in different patterns according to the state of the controller. It may be defined that a horizontal line pattern corresponds to green, a vertical line pattern corresponds to yellow, a diagonal line pattern corresponds to blue, and a dot pattern corresponds to gray. The display 230 may display a legend 310 indicating the meaning of a pattern and/or color of each box element.

The processor 242 may control the display 230 to display the screen indicating the states of the plurality of controllers corresponding to the operating state of the vehicle system 100 whenever the operating state of the vehicle system 100 is changed. The operating state of the vehicle system 100 may be exemplified as starting-on (ON), driving, or starting-off (OFF).

The processor 242 may control the display 230 to display the first screen indicating the state of each of the plurality of controllers 131-142 and 171-173 based on the ON of the vehicle system 100. When the vehicle system 100 is the ON, all of the plurality of controllers 131-142 and 171-173 may be converted to the state of wake-up. Referring to FIG. 2, all of the box elements representing the plurality of controllers 131-142 and 171-173 may be displayed in green and/or horizontal line patterns indicating the wake-up state.

In response to that the vehicle system 100 is switched to the ON, the processor 242 of the electronic system integrated verification device 200 may generate the input signals to be input the plurality of controllers 131-142 and 171-173 of the vehicle system 100 based on a predetermined driving scenario. The processor 242 may control the communication interface 210 to transmit the input signals to the vehicle system 100, and may receive the output signals of the plurality of controllers corresponding to the input signals.

The driving scenario may include, for example, various situations such as a situation in which any other vehicle approaches while driving, a situation in which a pedestrian approaches while driving, and a situation in which an impact occurs while driving. The electronic system integrated verification device 200 may generate the input signals to be input to the plurality of controllers 131-142 and 171-173 in each situation. Each of the plurality of controllers 131-142 and 171-173 included in the vehicle system 100 may generate the output signals corresponding to the input signals, and the output signals may be transmitted to the electronic system integrated verification device 200 through the ICU 120 and the CCU 110.

The test for the controllers of the vehicle system 100 needs to be performed even in an accident situation and a failure situation occurring while driving. However, it is difficult or impossible to actually implement all accident and failure situations for testing of controllers. The electronic system integrated verification device 200 may provide a virtual driving situation identical to an actual driving situation to the vehicle system 100. The electronic system integrated verification device 200 may generate the input signals corresponding to various driving situations, and may provide the generated input signals to the plurality of controllers. Accordingly, various tests of the vehicle system 100 are available even if the actual situation is not implemented.

The processor 242 of the electronic system integrated verification device 200 may control the display 230 to display the second screen indicating the state of each of the plurality of controllers 131-142 and 171-173 of the vehicle system 100 while driving. During driving, some of the plurality of controllers may operate normally, while others thereof may operate abnormally. For example, in a specific driving situation, the first controller 131, the second controller 132, and the third controller 133 among the plurality of controllers may be changed to the sleep state. In this case, the display 230 may display the box elements representing the first controller 131, the second controller 132, and the third controller 133 in gray and/or dot patterns.

The processor 242 may control the display 230 to display the third screen indicating the state of each of the plurality of controllers based on the OFF of the vehicle system 100. For example, as shown in FIG. 3, in response to that the vehicle system 100 is the OFF, among the plurality of controllers, the fifth controller 135, the sixth controller 136, and the ninth controller 139 may maintain the wake-up state, the tenth controller 140 and the twelfth controller 142 may change to the sleep ready state, the eleventh controller 141 may change to the sleep ack state, and the remaining controllers may change to the sleep state. The graphic elements representing the states of the plurality of controllers may be displayed on one screen. Accordingly, the user may easily identify the states of all the controllers.

Furthermore, the processor 242 may control the display 230 to display the fourth screen indicating the state of each of the plurality of controllers based on the unlocking of the vehicle system 100 after ignition off and locking of the vehicle system 100. When the vehicle system 100 is the OFF and locked, the plurality of controllers may be switched to the sleep state. Thereafter, in response to that the vehicle system 100 receives a unlock signal from the electronic system integrated verification device 200, the plurality of controllers may be switched to the wake-up state. The unlock signal may be generated by a FOB key, such as a smart key. However, although the vehicle system 100 receives the unlock signal, the controllers may not be switched to the wake-up state. In this case, the user may easily identify the states of the controllers through the GUI displayed on the display 230 of the electronic system integrated verification device 200.

Furthermore, the electronic system integrated verification device 200 may control the power supply 220 to supply the predetermined test power corresponding to a predetermined environmental condition to the vehicle system 100. For example, the battery of the vehicle system 100 may be in a low voltage state in an environmental condition in which the external temperature is low, such as in winter. When the battery of the vehicle system 100 enters the low voltage state, the states of the plurality of controllers may be changed. To reflect change in the battery of the vehicle system 100 according to the environmental condition, the electronic system integrated verification device 200 may supply the predetermined test power corresponding to the predetermined environmental condition to the vehicle system 100, and monitor an operation of the vehicle system 100 corresponding to the test power.

As such, the electronic system integrated verification device 200 may provide the GUI indicating the states of all controllers included in the vehicle system 100. Accordingly, the user may easily identify the operating states of the controllers included in the vehicle system 100. Furthermore, the electronic system integrated verification device 200 may provide the input signals corresponding to various driving situations to the vehicle system 100. Accordingly, the user may identify whether the controllers of the vehicle system 100 operate normally in various driving situations.

Figure 4:
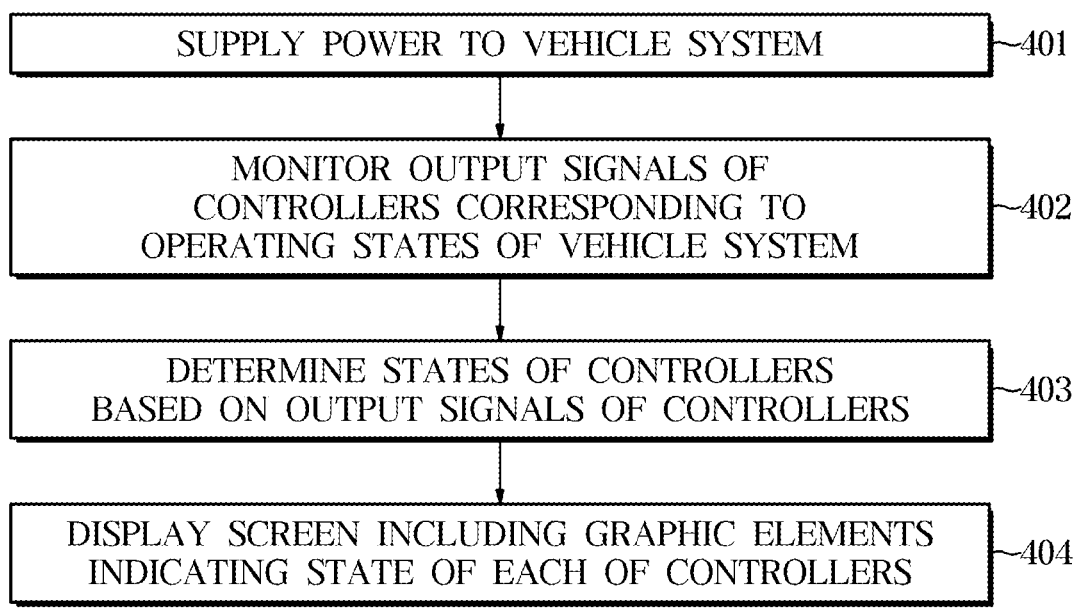
FIG. 4 is a flowchart illustrating an example of a method of controlling an electronic system integrated verification device.

FIG. 4 is a flowchart illustrating an example of a method of controlling an electronic system integrated verification device.

Referring to FIG. 4, the electronic system integrated verification device 200 may supply power to the vehicle system 100 (401). The electronic system integrated verification device 200 may monitor the output signals of the plurality of controllers corresponding to the operating states of the vehicle system 100 (402). The electronic system integrated verification device 200 may receive the output signals of the plurality of controllers included in the vehicle system 100. The electronic system integrated verification device 200 may determine the state of each of the plurality of controllers based on the output signals of the plurality of controllers (403). The electronic system integrated verification device 200 may display the screen including the graphic elements indicating the state of each of the plurality of controllers (404).

Figure 5:
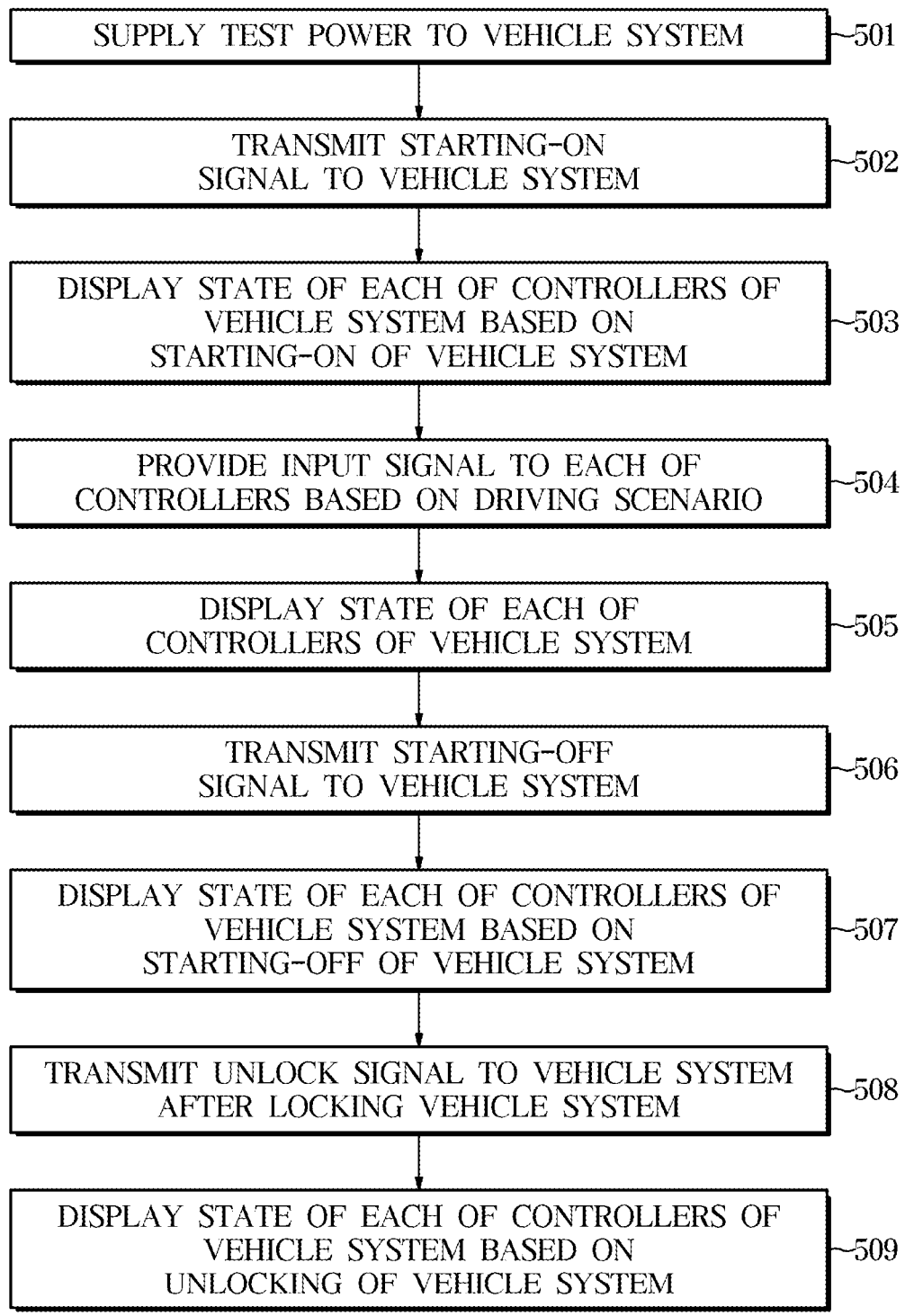
FIG. 5 is a flowchart illustrating an example of a method of controlling an electronic system integrated verification device in detail.

FIG. 5 is a flowchart illustrating an example of a method of controlling an electronic system integrated verification device in more detail.

Referring to FIG. 5, the power supply 220 of the electronic system integrated verification device 200 may supply the predetermined test power corresponding to the predetermined environmental condition to the vehicle system 100 (501). Furthermore, the electronic system integrated verification device 200 may transmit the starting-on signal to the vehicle system 100 (502). The vehicle system 100 may turn on the ignition of the vehicle based on the reception of the starting-on (ON) signal. The electronic system integrated verification device 200 may display the state of each of the plurality of controllers based on the ON of the vehicle system 100 (503). In other words, when the vehicle system 100 is turned to the ON, the electronic system integrated verification device 200 may display the first screen including the graphic elements representing the plurality of controllers.

The electronic system integrated verification device 200 may generate the input signals to be input to the plurality of controllers of the vehicle system 100 based on the predetermined driving scenario, and may provide the generated input signals to the plurality of controllers (504). Each of the plurality of controllers of the vehicle system 100 may generate the output signals corresponding to the input signals, and the output signals may be transmitted to the electronic system integrated verification device 200 through the ICU 120 and the CCU 110. The electronic system integrated verification device 200 may display the state of each of the plurality of controllers based on the output signals of the plurality of controllers of vehicle system 100 while driving (505). In other words, the electronic system integrated verification device 200 may display the second screen indicating the state of each of the plurality of controllers 131-142 and 171-173 of the vehicle system 100 while driving.

The electronic system integrated verification device 200 may transmit the starting-off signal to the vehicle system 100 (506). The vehicle system 100 may turn off the ignition of the vehicle based on the reception of the starting-off signal. When the vehicle system 100 is turned to the OFF, the plurality of controllers may be switched to the sleep state. The electronic system integrated verification device 200 may display the state of each of the plurality of controllers based on the OFF of the vehicle system 100 (507). In other words, when the vehicle system 100 is turned to the OFF, the electronic system integrated verification device 200 may display the third screen including the graphic elements representing the plurality of controllers.

The electronic system integrated verification device 200 may transmit the unlock signal to the vehicle system 100 after locking the vehicle system 100 (508). The vehicle system 100 may switch the plurality of controllers to the wake-up state based on the reception of the unlock signal. The electronic system integrated verification device 200 may display the state of each of the plurality of controllers based on the unlocking of the vehicle system 100 (509). In other words, when the vehicle system 100 is unlocked, the electronic system integrated verification device 200 may display the fourth screen including the graphic elements representing the plurality of controllers.

Figure 6:
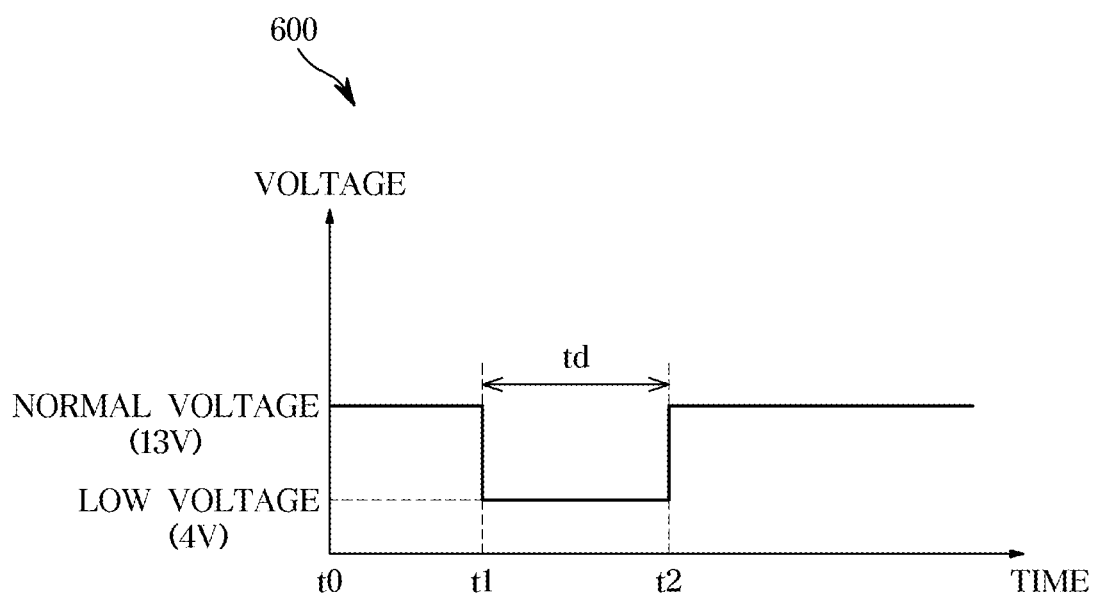
FIG. 6 is a graph illustrating an example of a test power supplied to the vehicle system.

FIG. 6 is a graph 600 illustrating an example of the test power supplied to the vehicle system.

Referring to FIG. 6, the electronic system integrated verification device 200 may control the power supply 220 to supply the predetermined test power corresponding to the predetermined environmental condition to the vehicle system 100. For example, the vehicle system 100 includes a battery that supplies power to the plurality of controllers. The performance of the battery is normal in a room temperature environment, but the performance thereof decreases in a low temperature environment. The battery of the vehicle system 100 may temporarily be in a low voltage state in an environmental condition where the external temperature is low, such as in winter. In other words, an output voltage of the battery may be lowered.

The plurality of controllers of the vehicle system 100 may enter the wake-up state when a normal voltage is applied, and may enter the sleep state when a voltage lower than the normal voltage is applied. In other words, if the voltage lower than the normal voltage is temporarily applied while the normal voltage is applied to the plurality of controllers, the plurality of controllers may temporarily operate abnormally. To reflect the change in the battery of the vehicle system 100 according to the environmental conditions, the electronic system integrated verification device 200 may supply the predetermined test power corresponding to the predetermined environmental condition to the vehicle system 100, and monitor the operation of the vehicle system 100 corresponding to the test power.

The electronic system integrated verification device 200 may supply a first test power to the vehicle system 100 so that the normal voltage is applied to the plurality of controllers included in the vehicle system 100 from a start time of diagnosis t0 to a first time t1. The electronic system integrated verification device 200 may supply a second test power to the vehicle system 100 so that the voltage lower than the normal voltage is applied to the plurality of controllers from the first time t1 to a second time t2. A time interval td from the first time t1 to the second time t2 may vary according to a design. The electronic system integrated verification device 200 may supply the first test power to the vehicle system 100 so that the normal voltage is applied to the plurality of controllers again after the second time t2.

The electronic system integrated verification device 200 may continuously monitor the states of the plurality of controllers from the start time of diagnosis t0. The electronic system integrated verification device 200 may determine the states of the plurality of controllers based on the output signals of the plurality of controllers, and display the screen including the graphic elements indicating the states of the plurality of controllers. Accordingly, the states of the plurality of controllers according to a change in voltage applied to the plurality of controllers may be easily identified.

Figure 7:
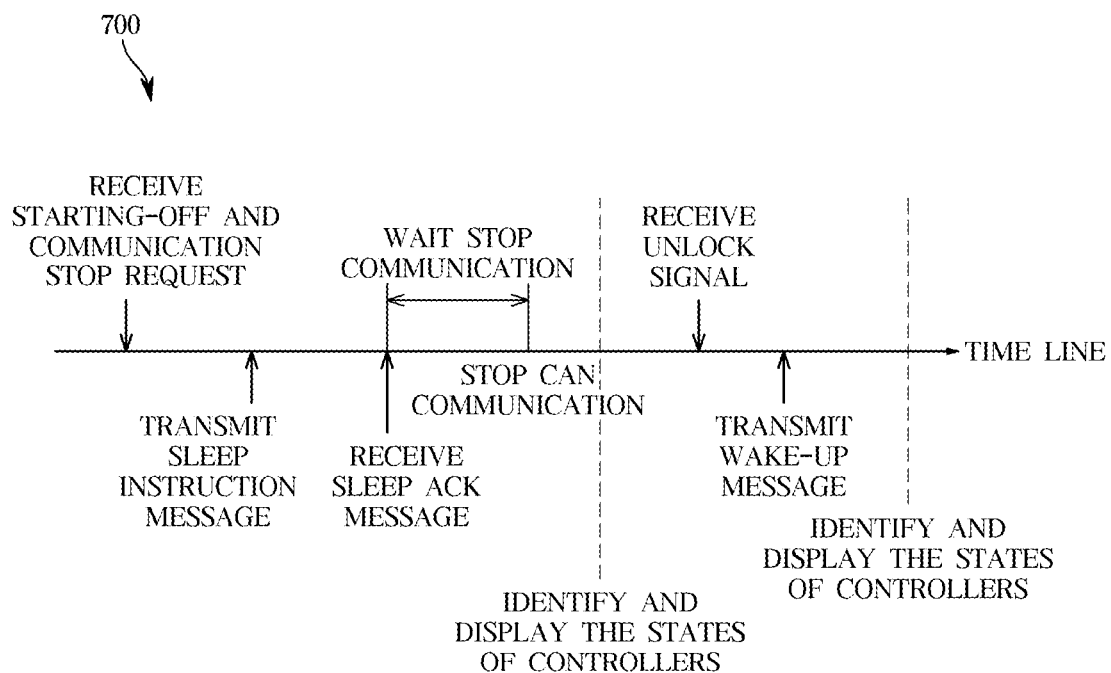
FIG. 7 is a diagram illustrating an example of a time line for explaining monitoring of controllers of the vehicle system after the vehicle system is turned to a starting-off.

FIG. 7 is a diagram illustrating an example of a time line 700 for explaining monitoring of the controllers of the vehicle system after the vehicle system is turned off.

Referring to FIG. 7, the ICU 120 of the vehicle system 100 may transmit a sleep instruction message to the plurality of controllers based on the reception of the starting-off signal and a communication stop request signal from the electronic system integrated verification device 200. Upon receiving a sleep ack message in response to the sleep instruction message from the plurality of controllers, the ICU 120 may stop CAN communication after a predetermined time elapses. In other words, the ICU 120 may wait to stop communication for the predetermined time.

The electronic system integrated verification device 200 may identify the states of the controllers of the vehicle system 100 in response to the CAN communication stop, and display the states of controllers.

Thereafter, the vehicle system 100 may receive the unlock signal from the electronic system integrated verification device 200. The ICU 120 may determine communication resumption based on the reception of the unlock signal, and transmit a wake-up message to the plurality of controllers. The electronic system integrated verification device 200 may identify the states of the controllers in response to the resumption of communication of the controllers, and display the states of the controllers.

Despite the resumption of communication, the controllers may not be switched to the wake-up state and remained in the sleep state. The electronic system integrated verification device 200 may distinguish and display the controller switched to the wake-up state and the controller maintaining the sleep state. The user may easily identify the states of the controllers included in the vehicle system 100 through the GUI displayed on the display 230 of the electronic system integrated verification device 200.

As is apparent from the above, the electronic system integrated verification device and method of controlling the same according to the disclosure may monitor the states of controllers included in the vehicle system according to various the operating states and environmental conditions of the vehicle system.

Further, the electronic system integrated verification device and method of controlling the same according to the disclosure may provide the GUI indicating the states of all controllers included in the vehicle system. Accordingly, the user may easily identify the operating states of the controllers included in the vehicle system.

Further, the electronic system integrated verification device and method of controlling the same according to the disclosure may provide the input signals corresponding to various driving situations to the vehicle system. Accordingly, the user may identify whether the controllers of the vehicle system operate normally in the various driving situations.

On the other hand, the above-described implementations may be implemented in the form of a recording medium storing instructions executable by a computer. The instructions may be stored in the form of program code. When the instructions are executed by a processor, a program module is generated by the instructions so that the operations of the disclosed implementations may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

What is claimed is:

1. An electronic system integrated verification device, comprising:
    a communication interface configured to communicate with a vehicle system;
    a power supply configured to supply power to the vehicle system;
    a display configured to display information regarding a state of the vehicle system; and
    a processor configured to:
        receive one or more output signals from a plurality of controllers included in the vehicle system through the communication interface,
        determine whether a state of each of the plurality of controllers is a wake-up state, a sleep ready state, a sleep acknowledgement state, or a sleep state based on the received one or more output signals from the plurality of controllers, and
        control the display to display a plurality of graphic elements corresponding to the states of the plurality of controllers.

2. The electronic system integrated verification device of claim 1, wherein the processor is further configured to:
    control, based on an operating state of the vehicle system being changed, the display to display a screen indicating states of the plurality of controllers corresponding to the operating state of the vehicle system.

3. The electronic system integrated verification device of claim 1, wherein the processor is further configured to control the display to:

display, based on a starting-on (ON) of the vehicle system, a first screen indicating the state of each of the plurality of controllers, display, based on a vehicle including the vehicle system being driven, a second screen indicating the state of each of the plurality of controllers of the vehicle system, and display, based on a starting-off (OFF) of the vehicle system, a third screen indicating the state of each of the plurality of controllers.

4. The electronic system integrated verification device of claim 1, wherein the processor is further configured to control the display to:

display, based on the vehicle system being unlocked after the starting-off and locking of the vehicle system, a fourth screen indicating the state of each of the plurality of controllers.

5. The electronic system integrated verification device of claim 1, wherein the processor is further configured to:

generate the plurality of graphic elements each having a predetermined color corresponding to the wake-up state, the sleep ready state, the sleep acknowledgement state, or the sleep state.

6. The electronic system integrated verification device of claim 1, wherein the processor is further configured to:

control the power supply to supply, to the vehicle system, a predetermined test power corresponding to a predetermined environmental condition.

7. The electronic system integrated verification device of claim 1, wherein the processor is further configured to:

generate one or more input signals to be input to the plurality of controllers of the vehicle system based on a predetermined driving scenario, control the communication interface to transmit the generated one or more input signals to the vehicle system, and receive, from the plurality of controllers, the one or more output signals corresponding to the one or more input signals.

8. A method of controlling an electronic system integrated verification device, the method comprising:

supplying, by a power supply, power to a vehicle system;

receiving, by a processor, one or more output signals from a plurality of controllers included in the vehicle system through a communication interface;

determining, by the processor, whether a state of each of the plurality of controllers is a wake-up state, a sleep ready state, a sleep acknowledgement state, or a sleep state based on the received one or more output signals from the plurality of controllers; and controlling, by the processor, a display to generate a plurality of graphic elements corresponding to the states of the plurality of controllers.

9. The method of claim 8, wherein controlling the display further comprises:

controlling, based on an operating state of the vehicle system being changed, the display to display a screen indicating states of the plurality of controllers corresponding to the operating state of the vehicle system.

10. The method of claim 8, wherein controlling the display further comprises:

controlling, based on a starting-on (ON) of the vehicle system, the display to display a first screen indicating the state of each of the plurality of controllers, controlling, based on a vehicle including the vehicle system being driven, the display to display a second screen indicating the state of each of the plurality of controllers of the vehicle system, and controlling, based on a starting-off (OFF) of the vehicle system, the display to display a third screen indicating the state of each of the plurality of controllers.

11. The method of claim 8, wherein controlling the display further comprises:

controlling, based on the vehicle system being unlocked after the starting-off and locking of the vehicle system, the display to display a fourth screen indicating the state of each of the plurality of controllers.

12. The method of claim 8, wherein each of the plurality of graphic elements is displayed in a predetermined color corresponding to the wake-up state, the sleep ready state, the sleep acknowledgement state, or the sleep state.

13. The method of claim 8, wherein controlling the power supply further comprises:

supplying, to the vehicle system, a predetermined test power corresponding to a predetermined environmental condition.

14. The method of claim 8, wherein receiving the output signals further comprises:

generating one or more input signals to be input to the plurality of controllers of the vehicle system based on a predetermined driving scenario, controlling the communication interface to transmit the generated one or more input signals to the vehicle system, and receiving, from the plurality of controllers, the one or more output signals corresponding to the one or more input signals.

* * * * *